United States Patent
Kim et al.

(10) Patent No.: US 9,661,520 B2
(45) Date of Patent: May 23, 2017

(54) METHOD AND APPARATUS FOR TRANSMITTING CHANNEL MEASUREMENT INFORMATION IN MOBILE COMMUNICATION SYSTEM

(75) Inventors: Sang Bum Kim, Seoul (KR); Soeng Hun Kim, Suwon-si (KR); Kyeong In Jeong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 305 days.

(21) Appl. No.: 13/577,520

(22) PCT Filed: Feb. 14, 2011

(86) PCT No.: PCT/KR2011/000965
§ 371 (c)(1),
(2), (4) Date: Aug. 7, 2012

(87) PCT Pub. No.: WO2011/102623
PCT Pub. Date: Aug. 25, 2011

(65) Prior Publication Data
US 2012/0307669 A1    Dec. 6, 2012

(30) Foreign Application Priority Data
Feb. 16, 2010   (KR) .......................... 10-2010-0013721

(51) Int. Cl.
H04W 24/10    (2009.01)
(52) U.S. Cl.
CPC .................................. *H04W 24/10* (2013.01)

(58) Field of Classification Search
CPC .............................. H04W 36/30; H04W 24/10
(Continued)

(56) References Cited

U.S. PATENT DOCUMENTS

| 2003/0087605 | A1  | 5/2003 | Das et al. |
| 2006/0031924 | A1* | 2/2006 | Kwon ..................... H04L 63/08 |
| | | | 726/2 |

(Continued)

FOREIGN PATENT DOCUMENTS

| JP | 2003-204298 A | 7/2003 |
| JP | 2007-110529 A | 4/2007 |

(Continued)

OTHER PUBLICATIONS

3GPP TR 36.805 (Dec. 2009) Technical Specification Group Radio Access Network; Study on Minimization of drive-tests in Next Generation Networks.*

(Continued)

*Primary Examiner* — Andrew Chriss
*Assistant Examiner* — Romani Ohri
(74) *Attorney, Agent, or Firm* — Jefferson IP Law, LLP

(57) ABSTRACT

A method and apparatus for transmitting channel measurement information in a mobile communication system are disclosed. The method and apparatus enable a user equipment to log channel measurement information and transmit the same to a base station so as to enhance radio network performance and reduce processing complexity of the user equipment by removing unnecessary operations of the user equipment and preventing waste of radio network capacity during transmission of channel measurement information.

18 Claims, 8 Drawing Sheets

(58) Field of Classification Search
USPC .................................. 370/252, 329, 336
See application file for complete search history.

(56) References Cited

U.S. PATENT DOCUMENTS

| | | | |
|---|---|---|---|
| 2006/0128371 A1 | 6/2006 | Dillon et al. | |
| 2009/0075648 A1 | 3/2009 | Reed et al. | |
| 2010/0041412 A1* | 2/2010 | Yu | H04W 24/10 455/450 |
| 2010/0190488 A1* | 7/2010 | Jung | H04W 24/10 455/424 |
| 2010/0216474 A1* | 8/2010 | Park | H04W 24/10 455/436 |
| 2010/0220618 A1 | 9/2010 | Kwon et al. | |
| 2011/0039557 A1* | 2/2011 | Narasimha | H04W 24/10 455/434 |
| 2011/0183662 A1* | 7/2011 | Lee et al. | 455/422.1 |
| 2011/0194441 A1* | 8/2011 | Jung | H04W 76/046 370/252 |
| 2011/0201279 A1* | 8/2011 | Suzuki et al. | 455/67.11 |
| 2011/0201324 A1* | 8/2011 | Persson et al. | 455/422.1 |
| 2011/0286356 A1* | 11/2011 | Tenny et al. | 370/254 |
| 2011/0317577 A1* | 12/2011 | Yamada | H04W 24/10 370/252 |
| 2012/0282968 A1* | 11/2012 | Toskala | H04W 24/10 455/517 |
| 2012/0309431 A1* | 12/2012 | Bodog | H04W 16/18 455/456.6 |

FOREIGN PATENT DOCUMENTS

| | | |
|---|---|---|
| KR | 10-2007-0080541 A | 8/2007 |
| KR | 10-2009-0031177 A | 3/2009 |
| KR | 10-2009-0040102 A | 4/2009 |
| WO | 2011-093666 A1 | 8/2011 |

OTHER PUBLICATIONS

Orange et al, "MDT Measurement Model", R2-100239, 3GPP TSG RAN WG2 Meeting, No. #68BIS, XP002629990, Valencia, Spain.
Qualcomm Europe, "Email Discussion Summary [66b nr 7] LTE-UMTS: Minimisation of Drive Tests", 3rd Generation Partnership Project (3GPP), Technical Specification Group (TSG) Radio Access Network (RAN), Working Group 2 (WG2), #67, XP002603559.
Samsung, "Procedure for Logged MDT in Idle", 3GPP Draft, R2-102292, 3rd Generation Partnership Project (3GPP), Mobile Competence Centre, XP050422623, Sophia-Antipolis Cedex, France.

* cited by examiner

METHOD AND APPARATUS FOR TRANSMITTING CHANNEL MEASUREMENT INFORMATION IN MOBILE COMMUNICATION SYSTEM

TECHNICAL FIELD

The present invention relates to transmission of channel measurement information in a mobile communication system and, more particularly, to a method and apparatus in a mobile communication system that enable a user equipment to log channel measurement information and transmit the same to a base station so as to enhance radio network performance and reduce processing complexity of the user equipment by removing unnecessary operations of the user equipment and preventing waste of radio network capacity during transmission of channel measurement information.

BACKGROUND ART

In general, mobile communication systems have been developed to provide communication services to users in motion. Thanks to rapid technical advancement, mobile communication systems are capable of providing not only voice communication services but also high-speed data communication services.

Recently, 3GPP has been working to standardize specifications for the Long Term Evolution-Advanced (LTE-A) system, which is regarded as a next generation mobile communication system. The LTE-A system is expected to be standardized in late 2010, and aims to realize high-speed packet based communication supporting a data rate higher than existing ones.

As 3GPP standards evolve, schemes for efficient radio network optimization are proposed. Generally in initial radio network deployment or optimization, the operator of a base station or base station controller has to collect radio environment information related to cell coverage though drive tests. In existing drive tests, a measurer is inconvenienced by having to drive a car loaded with measurement instruments along the road for a long time in a repetitive way. Measurement results are analyzed and used to set system parameters for the base station or base station controller. Such drive tests increase optimization and operating costs of radio networks and are time consuming. As such, a study named MDT (Minimization of Drive Tests) is in progress to reduce manual drive tests and enhance the process of radio environment analysis and parameter setting. Instead of performing drive tests, a user equipment (UE) performs channel measurement and logs the channel measurement information. Then, the user equipment may immediately send the channel measurement information to the base station, send the same in response to occurrence of a particular event, or send the same after expiration of a preset time. Hereinafter, transmission of channel measurement information collected by the user equipment to the base station is referred to as channel measurement information reporting or MDT measurement information reporting. The user equipment may immediately send channel measurement results when it is communicable with the base station, or may save the channel measurement results and send the same later when it become communicable with the base station.

The base station uses the channel measurement information received from the user equipment to optimize cell coverage. In LTE-A, MDT measurement information reporting is basically classified by UE RRC state as follows.

TABLE 1

| UE RRC state | Basic MDT measurement information reporting of UE |
|---|---|
| Idle mode | Logging and deferred reporting |
| Connected mode | Immediate reporting |
| Connected mode | Logging and deferred reporting |

MDT Measurement Information Reporting According to UE RRC State

Referring to Table 1, idle mode indicates a state in which the user equipment is not in communication with the base station, and connected mode indicates a state in which the user equipment is in communication with the base station. For MDT, as channel measurement information collected by the user equipment is transmitted through RRC signaling, the user equipment in idle mode is not required to transition to connected mode. In this case, the user equipment logs the collected channel measurement information and defers transmission of the same until transitioning to connected mode.

In connected mode, the user equipment may immediately send channel measurement information to the base station according to circumstances or may log the channel measurement information and send the same later as in idle mode.

In idle mode, the user equipment logs channel measurement information on an event basis or on a periodic basis. Examples of events triggering logging of channel measurement information are listed below.

(1) Periodic downlink pilot measurements
(2) Serving cell becomes worse than threshold
(3) Transmit power headroom becomes less than threshold
(4) Paging channel failure
(5) Broadcast channel failure
(6) Random access failure
(7) Radio link failure report Logging events (1), (2), (4), (5) and (7) may be used to optimize downlink cell coverage, and logging events (3) and (6) may be used to optimize uplink cell coverage. The event (1) is related to periodic logging of channel measurement information, and the other events are related to logging of channel measurement information when a given condition is satisfied. The logged channel measurement information is reported to the base station when the user equipment transitions to connected mode. The user equipment may also log channel measurement information in connected mode.

The user equipment in connected mode sends logged channel measurement information to the base station when a reporting event is triggered. Currently, various report triggering conditions are considered in standard meetings. As channel measurement information for MDT is needed by the base station, a report request made by the base station (on demand) and a report trigger sent by the user equipment to the base station are considered as a report triggering condition.

As MDT procedures are not clearly determined, it is necessary to define an optimized MDT procedure.

For the purpose of MDT, an MDT procedure will be carried out during initial deployment and optimization of a radio network. That is, it is sufficient to conduct MDT only for a particular duration. Hence, it is necessary to notify the user equipment of the time to conduct MDT. In addition, it is unnecessary to handle the logging events proposed at standard meetings in all RRC states. For example, as it is possible to measure power headroom only in connected mode, the logging event (3) may occur only in connected mode. Hence, it is necessary to define a logging event on a mode basis in consideration of usefulness and ease of implementation. Transmission of channel measurement information from the user equipment to the base station may result in reduction of uplink capacity for other data transfer. Hence, to prevent waste of radio resources, it is preferable to allow the base station to selectively request only necessary information from the user equipment. In particular, a large amount of channel measurement information will be logged when the user equipment remains in idle mode for a long time. Upon transitioning to connected mode, the user equipment may consume a lot of resources to send the logged channel measurement information. Accordingly, MDT procedures are to be developed in consideration of the above problems.

DISCLOSURE OF INVENTION

Technical Problem

The present invention has been made in view of the above problems, and the present invention provides a method and apparatus in a mobile communication system that enable a user equipment to log channel measurement information and transmit the same to a base station in a manner that enhances radio network performance and reduces processing complexity of the user equipment.

The present invention also provides a method for operating a user equipment and a base station that removes unnecessary operations of the user equipment and prevents waste of radio network capacity during transmission of channel measurement information.

Solution to Problem

An aspect of the present invention is to provide a method of transmitting channel measurement information for a user equipment in a mobile communication system, including: receiving MDT configuration information from a corresponding base station; performing, upon transitioning to idle mode, MDT measurement for channel status according to the MDT configuration information and logging MDT measurement information; sending, upon transitioning to connected mode, a flag indicating presence of the logged MDT measurement information to the base station; and sending, upon reception of a report request from the base station, the MDT measurement information to the base station.

Preferably, transmission of the MDT measurement information is performed with a lower priority than transmission of regular data. To achieve this, sending the MDT measurement information to the base station may include: establishing a radio bearer having a lower priority than that of a radio bearer for regular data; and transmitting the MDT measurement information via the established radio bearer.

Another aspect of the present invention is to provide a user equipment transmitting channel measurement information in a mobile communication system, including: a transceiver receiving MDT configuration information from a corresponding base station and sending MDT measurement information to the base station; a buffer storing collected MDT measurement information; and a controller controlling a process of performing, upon transitioning to idle mode, MDT measurement for channel status according to the MDT configuration information and logging MDT measurement information in the buffer, sending, upon transitioning to connected mode, a flag indicating presence of the logged MDT measurement information to the base station, and sending, upon reception of a report request from the base station, the MDT measurement information to the base station.

Another aspect of the present invention is to provide a method of receiving channel measurement information for a base station in a mobile communication system, including: sending MDT configuration information necessary for MDT measurement to a user equipment; receiving index information of MDT measurement information from the user equipment, and determining necessity of the MDT measurement information; and sending, when the MDT measurement information is necessary, a report request for the MDT measurement information to the user equipment.

Another aspect of the present invention is to provide a base station receiving channel measurement information in a mobile communication system, including: a transceiver sending MDT configuration information to a corresponding user equipment and receiving MDT measurement information from the user equipment; and a controller controlling a process of receiving index information of MDT measurement information from the user equipment, determining necessity of the MDT measurement information, and sending, when the MDT measurement information is necessary, a report request for the MDT measurement information to the user equipment.

Advantageous Effects of Invention

In a feature of the present invention, a user equipment may help to enhance radio network performance with reduced processing complexity during logging of channel measurement information and transmission thereof to a base station. In addition, waste of radio network capacity may be prevented by removing unnecessary operations of the user equipment during transmission of channel measurement information.

BRIEF DESCRIPTION OF DRAWINGS

The objects, features and advantages of the present invention will be more apparent from the following detailed description in conjunction with the accompanying drawings, in which.

MODE FOR THE INVENTION

Hereinafter, exemplary embodiments of the present invention will be described with reference to the accompanying drawings.

The present invention relates to a method and apparatus in a mobile communication system that enable a user equipment to log channel measurement information and transmit the same to a base station in a manner that enhances radio network performance and reduces processing complexity of the user equipment. The present invention also relates to an operation method for a user equipment and a base station that removes unnecessary operations of the user equipment and prevents waste of radio network capacity during transmission of channel measurement information.

In the present invention, an efficient MDT procedure is defined.

In particular, the method of the present invention includes logging channel measurement information by a user equipment in idle mode, and reporting the same in connected mode. The MDT procedure of the present invention includes a set of steps related to a direction of the base station indicating the time to perform MDT, definitions of MDT measurements and basic MDT operations that can be carried out according to RRC states, transmission of MDT measurement information with a lower priority than regular data, and permission of MDT reporting.

In the first embodiment of the present invention, the user equipment reports logged MDT measurement results only when the base station issues a report request. In the description, MDT measurement refers to channel measurement performed by the user equipment, and MDT measurement results are logged as MDT measurement information. MDT measurement information and channel measurement information may be used interchangeably. In this case, the base station may receive an advance notice indicating the content of logged MDT measurement results from the user equipment before determining whether to issue a report request to the user equipment.

In the second embodiment, the user equipment reports logged MDT measurement results to the base station when a triggering condition is satisfied. As the user equipment may report MDT measurement results without a report request, the base station may reject the report if the report is regarded as unnecessary.

In the third to fifth embodiments, the user equipment logs MDT measurement results and notifies the base station of the presence of channel measurement information. Later, the user equipment reports the MDT measurement information in response to a report request from the base station.

Hereinafter, a description is given of the first to fifth embodiments of the present invention.

First Embodiment

Figure 1:
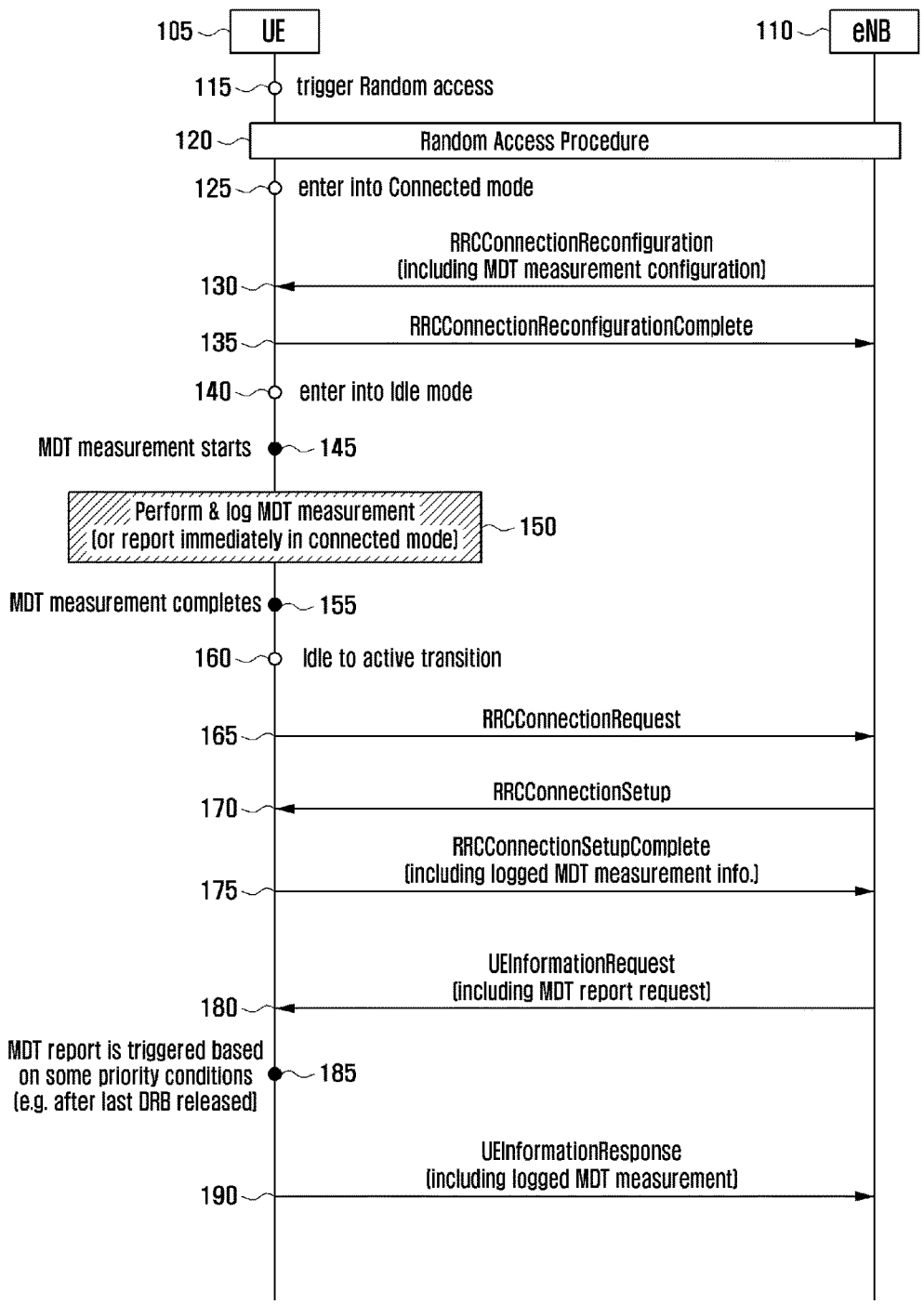
FIG. 1 is a sequence diagram illustrating a procedure for reporting logged channel measurement information by a user equipment in response to a report request from a base station according to a first embodiment of the present invention.

FIG. 1 is a sequence diagram illustrating a procedure for reporting logged channel measurement information by a user equipment (UE) 105 in response to a report request from a base station (eNB) 110.

To communicate with the base station 110, the user equipment 105 triggers random access (115) and invokes a random access procedure (120). The base station 110 then enters into connected mode (125). The base station 110 sends an RRCConnectionReconfiguration message containing MDT configuration information (information necessary to perform MDT) to the user equipment 105 (130). The MDT configuration information may include information regarding the time to conduct MDT measurement, the frequency and cell to be measured, and logging and reporting. An example of MDT configuration information is given below.

(1) Measurement objects: information regarding a frequency band and cell to be measured by the user equipment (2) Logging configurations: information on logging events, composed of logging criteria and logging format
    Logging criteria: criteria triggering UE MDT measurement (refer to 3GPP TR36.805 for more details)
        Periodic downlink pilot measurements
        Serving cell becomes worse than threshold
        Transmit power headroom becomes less than threshold
        Random access failure
        Paging channel failure
        Broadcast channel failure
        Radio link failure report
    Logging format: information on format related to logging information (refer to 3GPP TR36.805 for more details)

(3) MDT reporting configurations: information regarding MDT measurement reporting by the user equipment, composed of reporting criteria and reporting format
    Reporting criteria: criteria triggering UE reporting
        On demand: reporting upon request from the base station
        Absolute time based: reporting at preset time
        Periodic timer based: periodic reporting
        UE leaves logging campaign: reporting at MDT stop
        Location based: reporting at specific location
        UE memory usage based: reporting when UE memory buffer is full
        Combined triggers: combination of above criteria
        Other
    Reporting format: information on format related to reporting information (4) MDT start/stop configurations: information regarding MDT measurement time For the purpose of MDT, MDT measurement is carried out at initial deployment of a radio network and optimization thereof. That is, it is sufficient to conduct MDT only for a particular duration. Hence, it is necessary for the base station 110 to notify the user equipment 105 of the time to conduct MDT measurement. When the user equipment 105 is in connected mode, the base station 110 may directly signal the MDT stop time. When the user equipment 105 is in idle mode, as the base station 110 may be unable to directly signal the MDT stop time, the base station 110 may notify timer information to the user equipment 105 in advance so that the user equipment 105 stops MDT measurement upon timer expiration. Hence, the user equipment 105 immediately stops MDT measurement when an MDT stop signal is received from the base station 110 before expiration of the timer. Otherwise, the user equipment 105 continues MDT measurement and stops MDT measurement upon expiration of the timer.

(5) MDT measurement identities: information regarding parameters combining the above configuration variables, and corresponding to existing RRC measurement (6) Quantity configurations: filtering information related to measurement, and corresponding to existing RRC measurement As a reply to the RRCConnectionReconfiguration message, the user equipment 105 sends an RRCConnectionReconfigurationComplete message to the base station 110 (135). The user equipment 105 enters into idle mode (140) and starts MDT measurement at the MDT start time (145). MDT configuration information may also be transported through an RRCConnectionRelease message that is sent by the base station to the user equipment before RRC connection release. In other words, MDT configuration information may be transferred to the user equipment either when an RRC connection is setup between the base station and user equipment or when the RRC connection is released.

The user equipment 105 logs MDT measurements when a logging criterion is satisfied during MDT measurement (150). Here, it may be not reasonable for the user equipment 105 to consider all the logging criteria during MDT measurement. For example, since power headroom is measurable only in connected mode, the logging criterion "Transmit power headroom becomes less than threshold" may be satisfied only in connected mode.

Hence, basic MDT operations may be classified according to operation modes in consideration of usefulness and ease of implementation as illustrated in Table 2.

TABLE 2

| MDT measurements | Idle mode: logged reporting | Connected mode: immediate reporting |
| --- | --- | --- |
| Periodic downlink pilot measurements | Yes | No |
| Serving cell becomes worse than threshold | Yes | No |
| Transmit power headroom becomes less than threshold | No | Yes |
| Random access failure | Yes | No |
| Paging channel failure | Yes | No |
| Broadcast channel failure | Yes | No |
| Radio link failure report | No | Yes |

Basic MDT Operations Classified by RRC State

In general, existing RRC measurements obtained in connected mode may include most MDT measurements. In connected mode, desired channel measurement information may be obtained using existing RRC measurements except for those related to "Transmit power headroom becomes less than threshold" and "Radio link failure report". If the same process is not repeated, only MDT measurements related to these two events are collected in connected mode. Hence, the amount of MDT measurements collected in connected mode is unlikely to be large. On the contrary, in idle mode, as RRC measurements are not obtained, most MDT measurements have to be collected. As the user equipment remains in idle mode for a time much longer than that in connected mode, the amount of MDT measurements collected in idle mode is likely to be larger than that collected in connected mode.

The user equipment 105 stops MDT measurement when the specified time expires (155).

Thereafter, the user equipment 105 determines to transition to connected mode (160) and sends an RRCConnectionRequest message to the base station 110 (165). When the base station 110 accepts the request, it sends an RRCConnectionSetup message to the user equipment 105 (170).

After transitioning to connected mode, the user equipment 105 may transfer channel measurement information logged in idle mode to the base station 110. To transfer channel measurement information, the user equipment 105 sends an RRCConnectionSetupComplete message containing index information of the logged channel measurement information to the base station 110 (175). The index information may include:

(1) Amount of logged measurement information
(2) Event related to MDT measurement (for example, random access failure or other)
(3) Elapsed time after logging
(4) MDT configuration applied to MDT measurement
(5) Others.

Such index information notifies the base station 110 of the type of channel measurement information logged in the user equipment 105 so that the base station 110 may determine whether to issue a report request for the logged channel measurement information.

For example, when the user equipment 105 remains in idle mode for a long time, it may log a large amount of channel measurement information. Upon transitioning to connected mode, the user equipment 105 may have to consume a lot of resources to send the channel measurement information. To overcome this problem, the base station 110 requests necessary information only on the basis of index information.

When the channel measurement information logged in the user equipment 105 is necessary, the base station 110 sends a UEInformationRequest message containing an MDT report request to the user equipment 105 (180).

Upon reception of the UEInformationRequest message, the user equipment 105 triggers reporting of MDT measurement information after the last data radio bearer (DRB) related to regular data is released (185). This is because regular data has a higher priority than logged measurement information. That is, logged measurement information need not be sent immediately. Alternatively, a separate radio bear with a low priority may be established to transmit MDT measurement information.

The user equipment 105 sends a UEInformationResponse message containing the MDT measurement information to the base station 110 (190).

Second Embodiment

Figure 2:
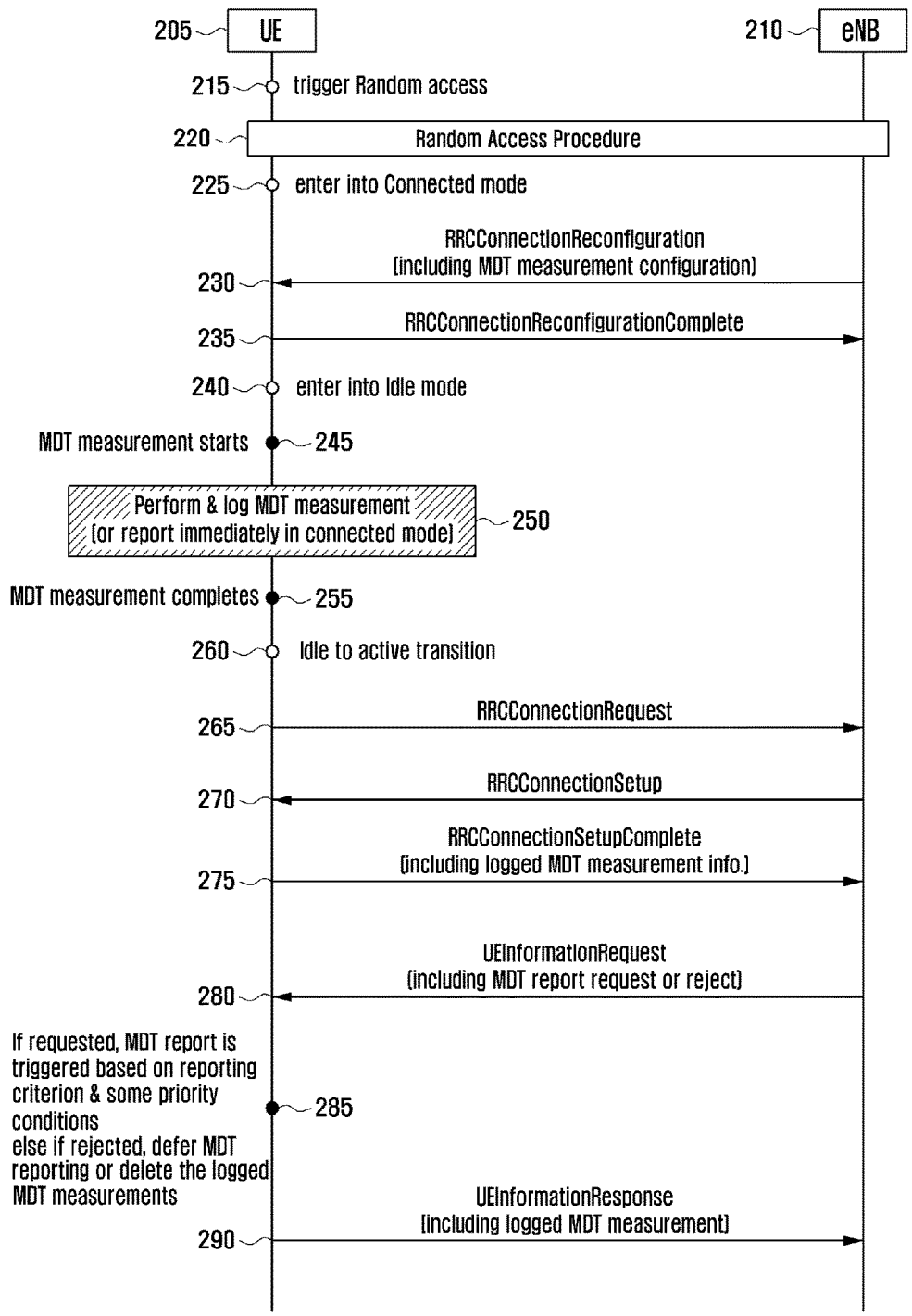
FIG. 2 is a sequence diagram illustrating a procedure for reporting channel measurement information by a user equipment to a base station in response to satisfaction of a report triggering condition according to a second embodiment of the present invention.

FIG. 2 is a sequence diagram illustrating a procedure for reporting channel measurement information by a user equipment (UE) 205 to a base station (eNB) 210 in response to satisfaction of a report triggering condition.

Steps 215 to 275 of FIG. 2 are identical respectively to steps 115 to 175 of FIG. 1, and a description thereof is thus omitted.

In the second embodiment, unlike the first embodiment, the user equipment 205 may send logged MDT measurement information, when a specific condition is satisfied, without a report request from the base station 210.

Here, the condition may correspond to any reporting criterion other than "on demand". For example, the user equipment 205 may send logged measurement information to the base station 210 at a preset time or when the memory buffer is nearly full. However, measurement information sent by triggering such a reporting criterion may be information that is not really needed by the base station 210.

To prevent this, the base station 210 may reject reporting of measurement information on the basis of index information contained in the RRCConnectionSetupComplete received from the user equipment 205. That is, referring to FIG. 2, when the measurement information is not necessary, the base station 210 sends a UEInformationRequest containing a report rejection indication to the user equipment 205 (280).

When the received UEInformationRequest contains a report rejection indication, the user equipment 205 ignores triggering of MDT reporting caused by satisfaction of a corresponding reporting criterion. Here, to identify the intentions of the base station 210, the user equipment 205 may defer MDT measurement reporting for a preset time after transmission of the RRCConnectionSetupComplete message.

When MDT measurement reporting is accepted by receiving a UEInformationRequest containing an MDT report request or no information is received from the base station 210 for a preset time, the user equipment 205 triggers MDT reporting (285) and sends the MDT measurement information to the base station 210 in consideration of transmission priority (290).

Figure 3:
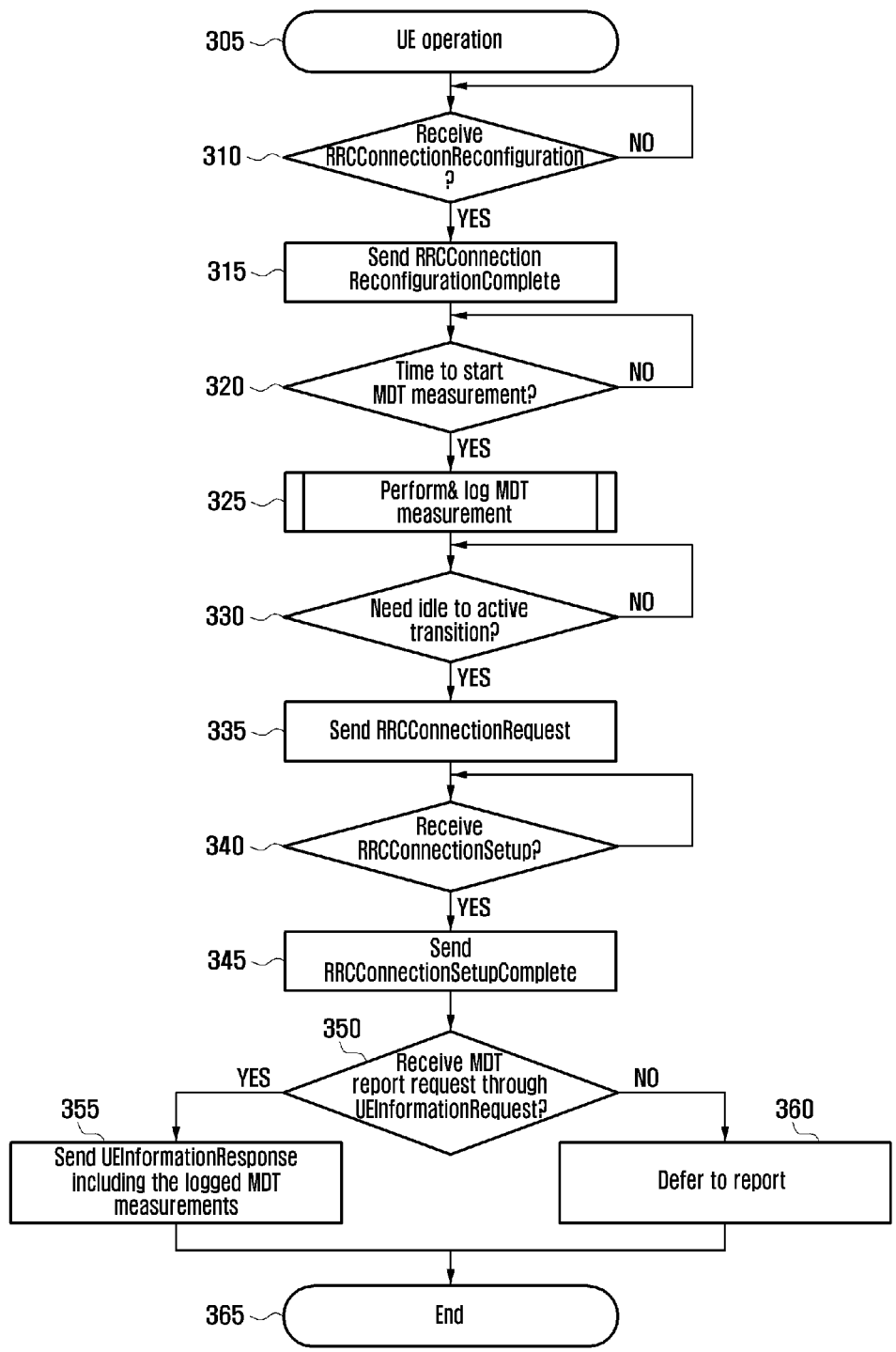
FIG. 3 is a flow chart illustrating steps performed by the user equipment conducting MDT operation.

FIG. 3 is a flow chart illustrating steps performed by the user equipment 105 conducting MDT operation.

Referring to FIG. 3, when an RRCConnectionReconfiguration message is received from the base station 110, the user equipment 105 extracts MDT configuration information from the received message (310). As a reply, the user equipment 105 sends an RRCConnectionReconfigurationComplete message to the base station 110 (315).

When the MDT measurement time indicated by the MDT start/stop configuration of the MDT configuration information is reached (320), the user equipment 105 starts MDT measurement and logs measurement results upon satisfaction of a logging event (325).

Thereafter, the user equipment 105 determines necessity of transitioning from idle mode to connected mode (330). When transitioning to connected mode is necessary, the user equipment 105 sends an RRCConnectionRequest message to the base station 110 (335). As a reply, the base station 110 sends an RRCConnectionSetup message to the user equipment 105 (340).

As a reply to the RRCConnectionSetup message, the user equipment 105 sends an RRCConnectionSetupComplete message containing index information of the logged MDT measurement information to the base station 110 (345).

When the logged MDT measurement information is determined to be necessary after examining the index information, the base station 110 sends a UEInformationRequest message containing an MDT report request to the user equipment 105 (350). Upon reception of the UEInformationRequest message containing an MDT report request, the user equipment 105 sends a UEInformationResponse message containing the logged MDT measurement information to the base station 110 (355).

When the received UEInformationRequest contains a report rejection indication, the user equipment 105 defers reporting of the MDT measurement information (360). Here, if the user equipment 105 has a report triggering condition separate from a report request, it may send MDT measurement information upon triggering of the report triggering condition when a report request is received from the base station 110 or a report rejection indication is not received. Alternatively, when a report rejection indication is received from the base station 110, the user equipment 105 may ignore triggering of the report triggering condition and defer reporting.

Figure 4:
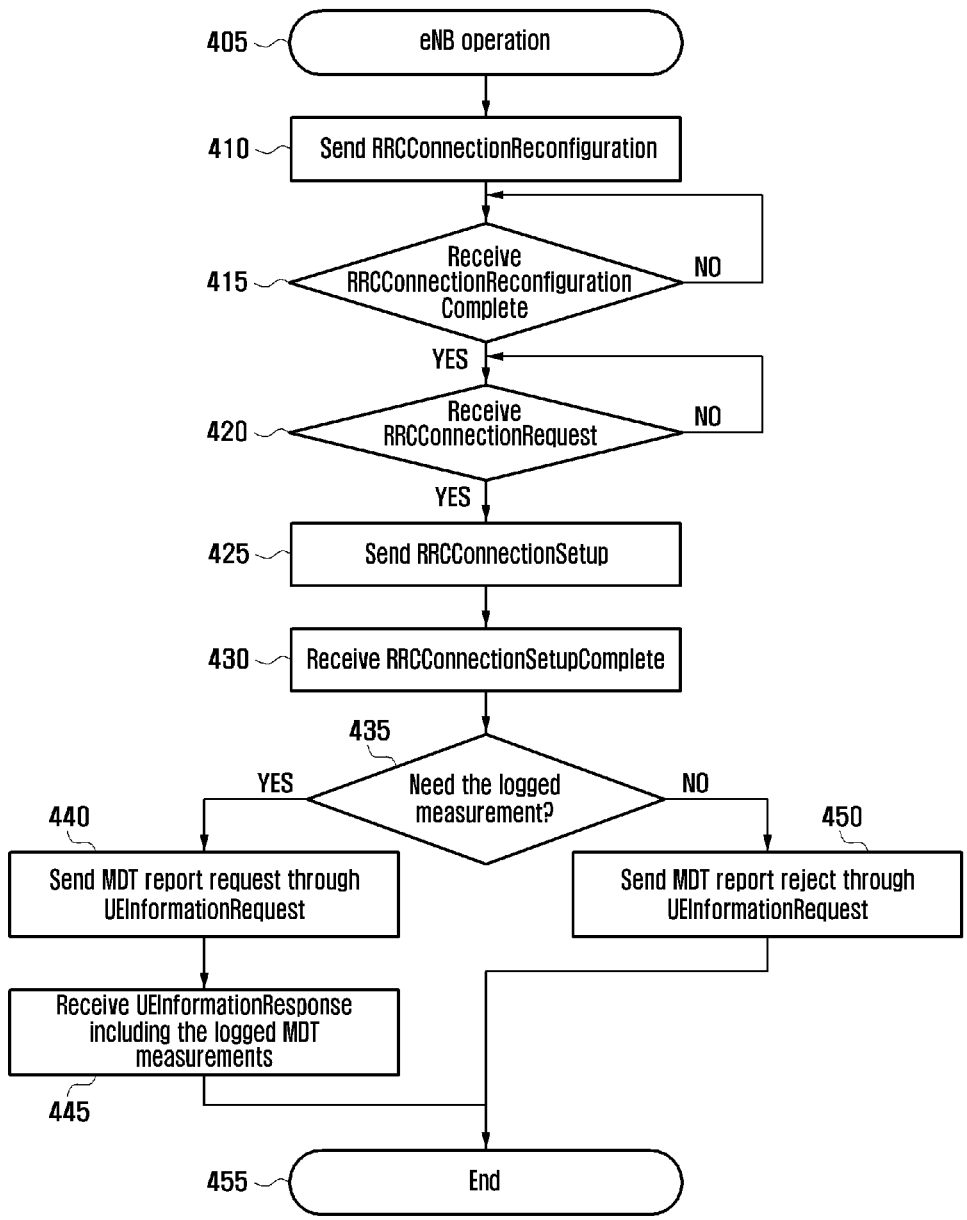
FIG. 4 is a flow chart illustrating steps performed by the base station conducting MDT operation.

FIG. 4 is a flow chart illustrating steps performed by the base station 110 conducting MDT operation.

Referring to FIG. 4, for MDT operation, the base station 110 sends an RRCConnectionReconfiguration message containing MDT configuration information to the user equipment 105 (410). When the RRCConnectionReconfiguration message is successfully received, the user equipment 105 sends an RRCConnectionReconfigurationComplete message to the base station 110. The base station 110 receives the RRCConnectionReconfigurationComplete message (415).

When data to be sent is present, the user equipment 105 sends an RRCConnectionRequest message to the base station 110. The base station 110 receives the RRCConnectionRequest message (420) and sends, as a reply, an RRCConnectionSetup message to the user equipment 105 (425).

As a reply to the RRCConnectionSetup message, the user equipment 105 sends an RRCConnectionSetupComplete message containing index information of logged measurement information to the base station 110. The base station 110 receives the RRCConnectionSetupComplete message (430) and determines whether the measurement information logged in the user equipment 105 is necessary (435).

When the logged measurement information is necessary, the base station 110 sends a UEInformationRequest message containing a report request to the user equipment 105 (440). Later, the base station 110 receives a UEInformationResponse message containing the MDT measurement information from the user equipment 105 (445).

When the logged measurement information is not necessary, the base station 110 sends a UEInformationRequest message containing a report rejection indication to the user equipment 105 (450).

Here, when the user equipment 105 has enabled the "on demand" reporting criterion, the base station 110 does not have to separately notify a report rejection indication to the user equipment 105. This is because the user equipment 105 having enabled the "on demand" reporting criterion sends a measurement report only when the base station 110 issues a request.

Third Embodiment

Figure 5:
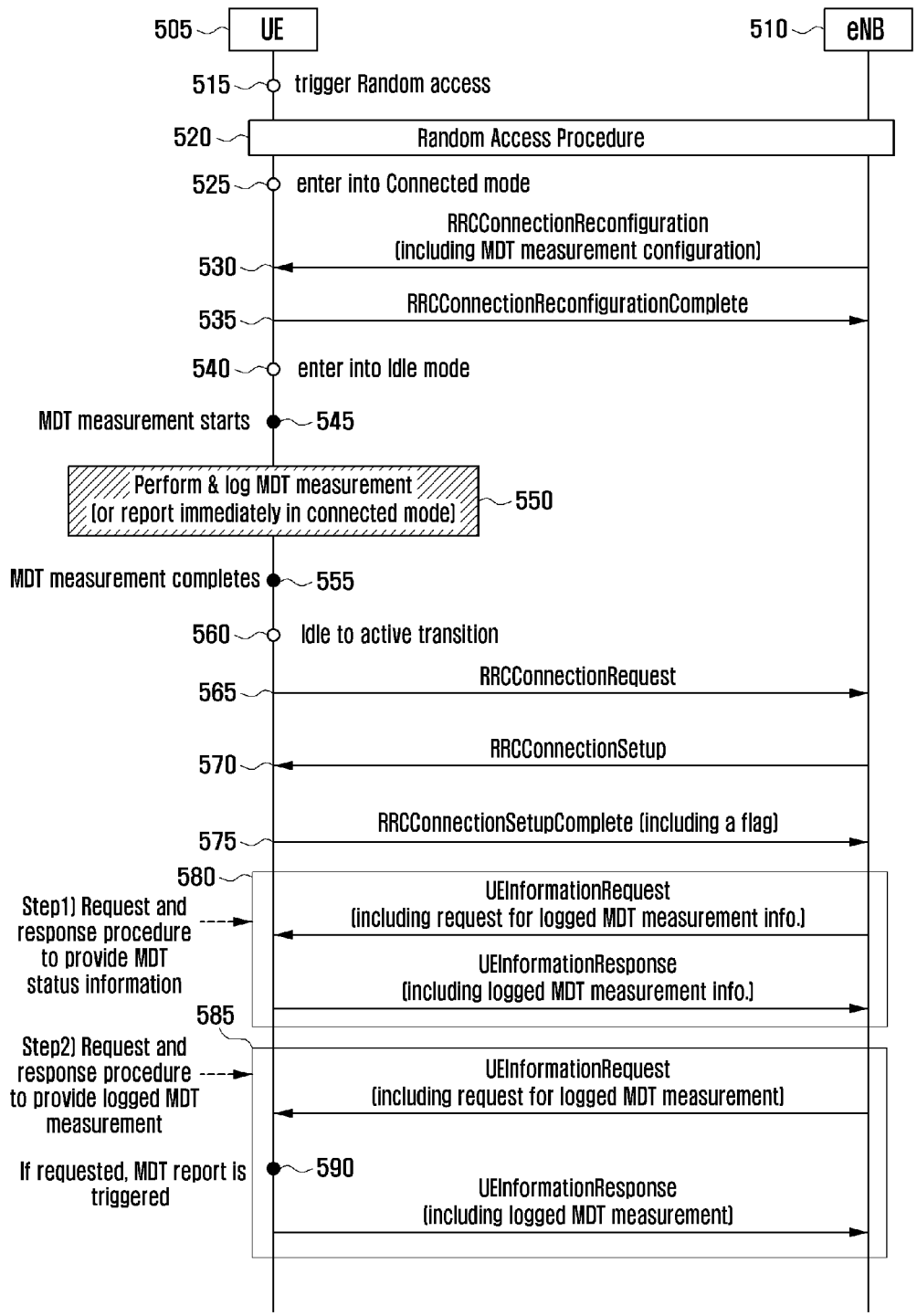
FIG. 5 is a sequence diagram illustrating a procedure for reporting channel measurement information in which a user equipment notifies a base station of collected channel measurement information and sends the channel measurement information according to a report request from the base station according to a third embodiment of the present invention.

FIG. 5 is a sequence diagram illustrating a procedure for reporting channel measurement information in which a user equipment 505 notifies a base station 510 of collected channel measurement information and sends the channel measurement information according to a report request from the base station 510.

Steps 515 to 570 of FIG. 5 are identical respectively to steps 115 to 170 of FIG. 1, and a description thereof is omitted.

To transition from idle mode to connected mode, the user equipment 505 has to perform RRC connection establishment, which corresponds to steps 565 to 575 of FIG. 5. In the first and second embodiments, the user equipment provides index information of channel measurement information to the base station during RRC connection establishment. This means a modification to the existing RRC connection establishment operation.

The user equipment may also send logged channel measurement information to the base station without modification to the existing RRC connection establishment operation (corresponding to steps 565 to 575), contributing to reduction of system complexity and overhead.

To achieve this, in the third embodiment, the user equipment 505 notifies the base station 510 of logged MDT measurement information during RRC connection establishment. That is, the user equipment 505 sends an RRCConnectionSetupComplete message containing a flag (575). Here, the flag informs the base station 510 of MDT measurement information logged in the user equipment 505. For example, the flag set to '0' may indicate absence of logged MDT measurement information and the flag set to '1' may indicate presence of logged MDT measurement information.

When an RRCConnectionSetupComplete message containing a flag set to '1' is received, the base station 510 requests the user equipment 505 to send MDT measurement information in the following two stages.

First, to prevent accumulation of unnecessary channel measurement information, the base station 510 sends a request for index information of MDT measurement information to the user equipment 505 (580). As described before in connection with the first embodiment, the index information may include:
(1) Amount of logged measurement information
(2) Event related to MDT measurement (for example, random access failure or other)
(3) Elapsed time after logging
(4) MDT configuration applied to MDT measurement
(5) Others.

The base station may use a UEInformationRequest message to request index information and use a UEInformationResponse message to collect index information.

Second, the base station 510 analyzes the received index information to determine necessity of the MDT measurement information logged in the user equipment 505; and, when the logged MDT measurement information is necessary, the base station 510 sends a UEInformationResponse message containing a report request to the user equipment 505 (585). When a report request is issued by the base station 510, the user equipment 505 triggers reporting of the MDT measurement information (590) and sends a UEInformationResponse message containing the MDT measurement information to the base station 510.

Fourth Embodiment

Figure 6:
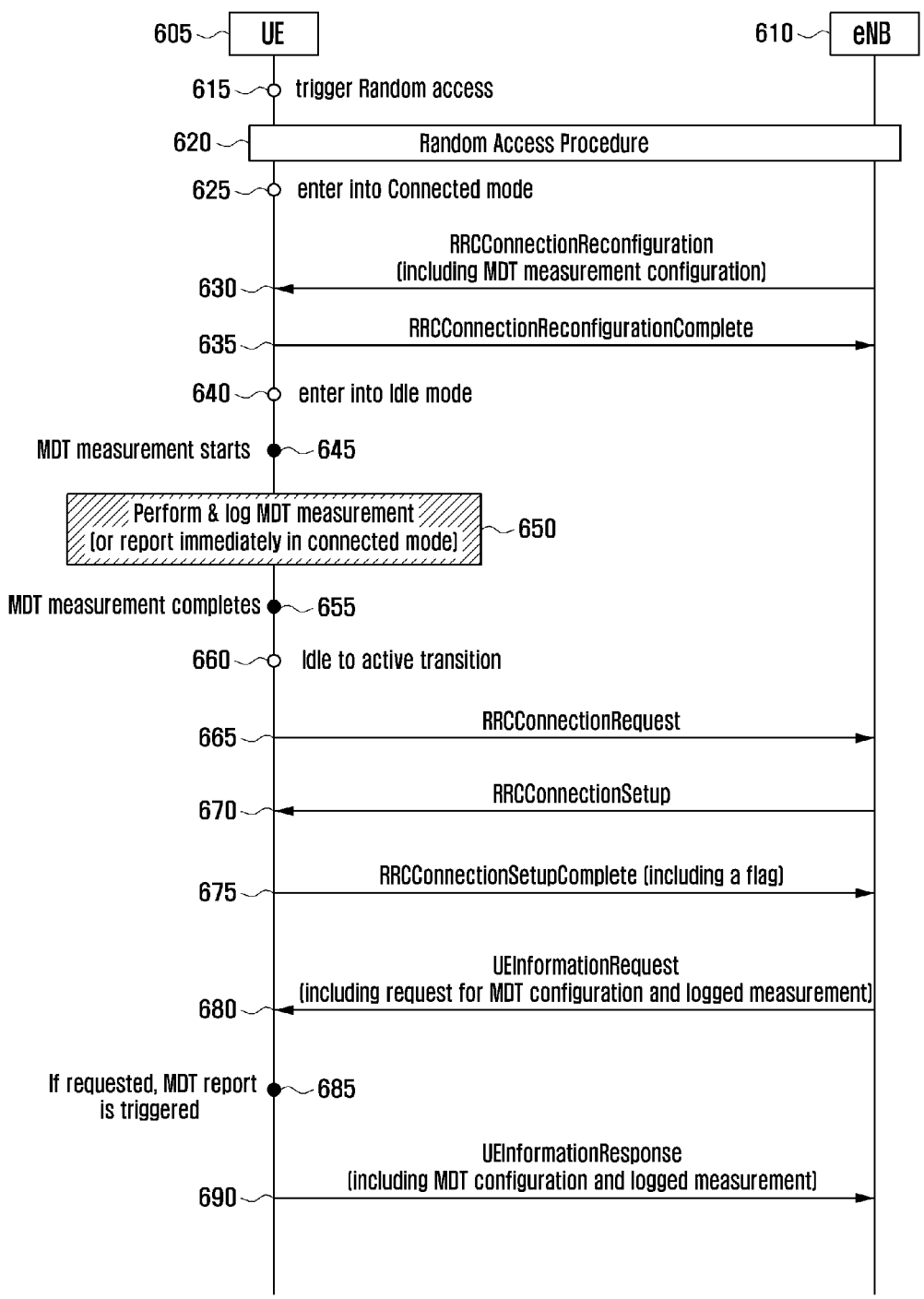
FIG. 6 is a sequence diagram illustrating a procedure for reporting channel measurement information derived from the procedure of FIG. 5 by replacing a two-step report requesting operation with a single-step operation according to a fourth embodiment of the present invention.

FIG. 6 is a sequence diagram illustrating a procedure for reporting channel measurement information derived from the third embodiment of FIG. 5 by replacing a two-step report requesting operation with a single-step operation.

As in the third embodiment, the user equipment 605 sends an RRCConnectionSetupComplete message containing a flag to the base station 610 (675). Here, the flag informs the base station 610 of MDT measurement information logged in the user equipment 605. The flag set to '0' indicates absence of logged MDT measurement information and the flag set to '1' indicates presence of logged MDT measurement information.

When an RRCConnectionSetupComplete message containing a flag set to '1' is received, the base station 610 sends, if necessary, a UEInformationRequest message to request the user equipment 605 to transfer the MDT measurement information (680). The user equipment 605 sends a UEInformationResponse message containing the MDT measurement information and the following information to the base station 610 (690).

(1) MDT configuration applied to MDT measurement
(2) Others.

As channel measurement information is also sent to the base station 610 in the fourth embodiment, items (1) to (3) of the index information of MDT measurement information in the third embodiment may be unnecessary.

Fifth Embodiment

Figure 7:
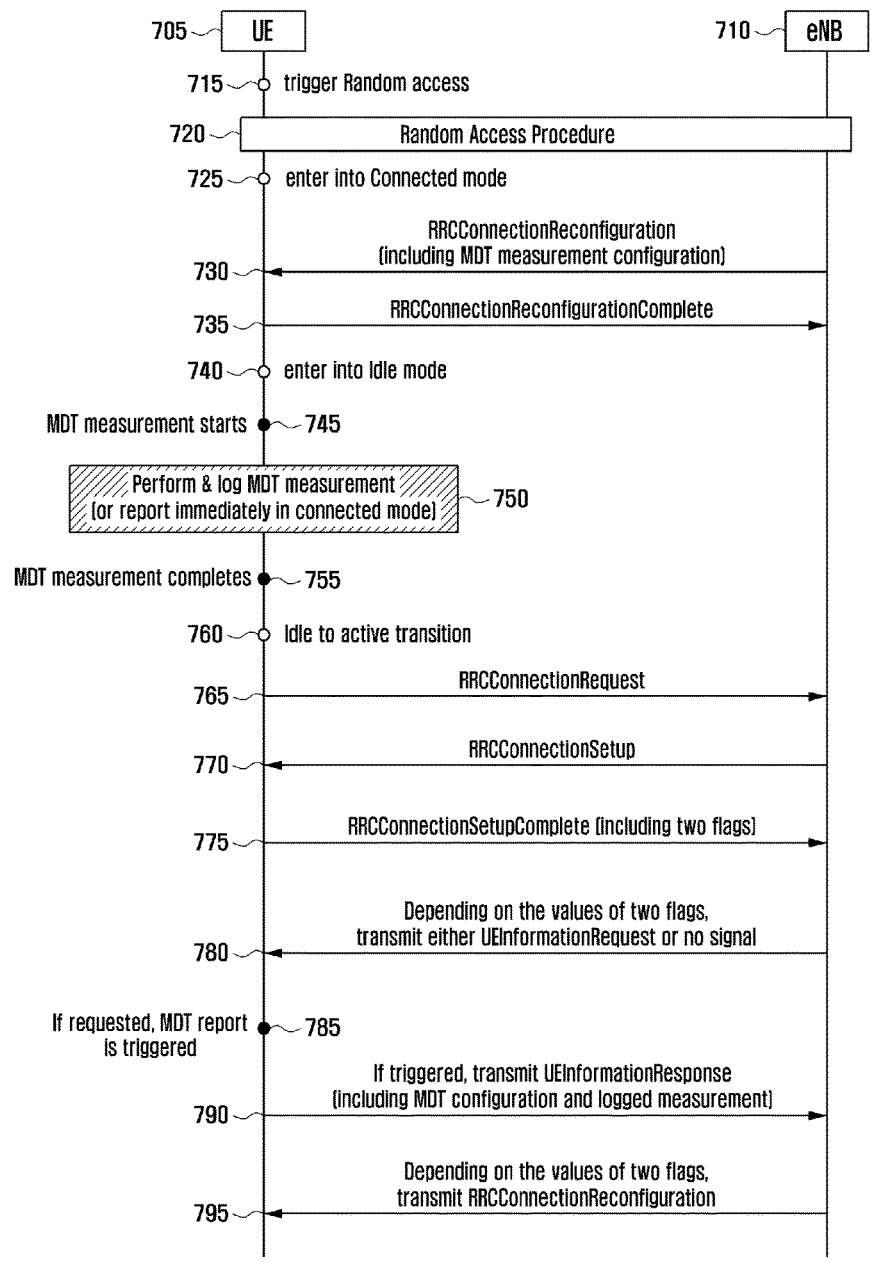
FIG. 7 is a sequence diagram illustrating a procedure for reporting channel measurement information in which a user equipment notifies a base station of collected channel measurement information using two flags and sends the channel measurement information according to a report request from the base station according to a fifth embodiment of the present invention.

FIG. 7 is a sequence diagram illustrating a procedure for reporting channel measurement information in which a user equipment 705 notifies a base station 710 of collected channel measurement information using two flags and sends the channel measurement information according to a report request from the base station 710.

It is necessary for the base station 710 to identify whether the user equipment 705 has completed MDT measurement according to a specific MDT configuration. While the user equipment 705 is performing MDT measurement, it is unnecessary for the base station 710 to request transmission of MDT measurement information. When the user equipment 705 has completed MDT measurement, the base station 710 may request the user equipment 705 to send logged MDT measurement information or may request the user equipment 705 to change the MDT configuration (reconfiguration) for new MDT measurement.

To achieve this, the user equipment 705 sends an RRCConnectionSetupComplete message containing two flags to the base station 710 (775). Here, the first flag indicates presence of MDT measurement information as in the third embodiment. That is, when MDT measurement information is not present, the first flag is set to '0'; and when MDT measurement information is present, the first flag is set to '1'. The second flag indicates completion of MDT measurement. That is, when the user equipment 705 is conducting MDT measurement, the second flag is set to '0'; and when the user equipment 705 has completed MDT measurement, the second flag is set to '1'. When none of the logging criteria are satisfied while the user equipment 705 is conducting MDT measurement according to configuration information received from the base station 710, measurement information may be not collected.

Table 3 shows an example of base station operations corresponding to the value of the two flags.

TABLE 3

| Two flags | MDT performance | BS operation |
| --- | --- | --- |
| 00 | Consider that UE is logging nothing even though MDT was configured. And consider UE as still performing MDT configured previously. | Not demand and Not reconfigure |
| 10 | Consider that MDT was configured and UE has logged measurement. And consider UE as still performing MDT configured previously. | Not demand and Not reconfigure |
| 01 | Consider that UE is logging nothing even though MDT was configured, or UE was not configured. And consider that it is possible to configure or reconfigure MDT. | Not demand andPossible to reconfigure |
| 11 | Consider that MDT was configured and UE has logged measurement. And consider that it is possible to reconfigure MDT. | Possible to demand and Possible to reconfigure |

Base Station Operations Corresponding to Flag Values

When the flags are set to '00', the base station 710 regards the user equipment 705 as having no logged channel measurement information and as conducting previously configured MDT measurement, and neither requests an MDT report nor reconfigures MDT measurement. When the flags are set to '10', the base station 710 regards the user equipment 705 as having logged channel measurement information and as conducting previously configured MDT measurement, and does not perform an MDT related action. When the flags are set to '01', the base station 710 regards the user equipment 705 as having no logged channel measurement information and as not conducting MDT measurement, and does not requests an MDT report but may reconfigure MDT measurement. When the flags are set to '11', the base station 710 regards the user equipment 705 as having logged channel measurement information and as not conducting MDT measurement, and may request an MDT report and reconfigure MDT measurement.

When the flags are set to '11', the user equipment 705 may be regarded as having completed MDT measurement as directed. In this case, the base station 710 may send a UEInformationRequest message containing a report request to the user equipment 705 (780). When MDT reporting is requested, the user equipment 705 triggers reporting (785) and send a UEInformationResponse message containing the MDT measurement information and the following information to the base station 710 (790).

(1) MDT configuration applied to MDT measurement
(2) Others

For the user equipment 705 having completed MDT measurement as directed, if necessary, the base station 710 may send an RRCConnectionReconfiguration message to the user equipment 705 for new MDT measurement (795).

Figure 8:
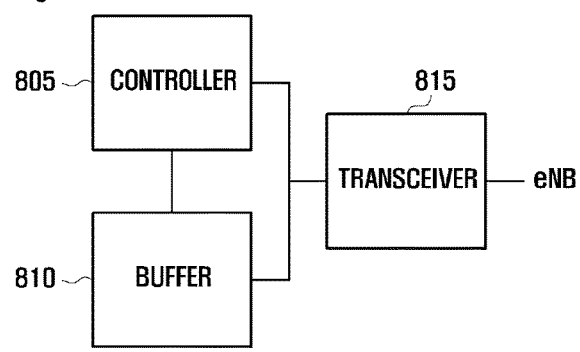
FIG. 8 is a block diagram of a user equipment conducting MDT operation.

FIG. 8 is a block diagram of a user equipment (UE) 105 conducting MDT operation. As shown in FIG. 8, the user equipment 105 may include a controller 805, a buffer 810 and a transceiver 815.

The transceiver 815 sends and receives RRC-messages to and from the base station 110, and performs channel measurement under control of the controller 805. A received RRC-message is forwarded to the controller 805 and used to control operations of the user equipment 105.

The controller 805 performs channel measurement and collects channel measurement information if needed. In this case, as shown in Table 2, the controller 805 may selectively trigger an event for logging channel measurement information according to the state of connection with the base station 110. The controller 805 logs collected channel measurement information in the buffer 810 according to the triggered logging event. The controller 805 controls an operation to transfer index information of logged channel measurement information to the base station 110. Here, the index information may include at least one of the amount of logged measurement information, events related to MDT measurement, the elapsed time after logging and the MDT configuration applied to MDT measurement. In an embodiment, as to transmission, logged channel measurement information may have a lower priority than regular data. In another embodiment, the controller 805 may establish a separate radio bearer with a low priority to transmit channel measurement information to the base station 110.

The controller 805 controls an operation to transmit channel measurement information to the base station 110 according to a request from the base station 110 or an internal criterion. For transmission, the controller 805 may assign a lower priority to channel measurement information than that of regular data.

In the second embodiment, the controller 805 may provide index information to the base station and then receive a report rejection indication from the base station. In this case, the controller 805 may ignore triggered reporting of channel measurement information.

In the third embodiment, the controller 805 may provide a flag that indicates presence of logged channel measurement information to the base station. The base station may send a request for index information of the channel measurement information. When a request for index information is received, the controller 805 sends the index information to the base station.

In the fourth embodiment, the controller 805 may provide a flag that indicates presence of logged channel measurement information to the base station. When a request is received, the controller 805 may send the channel measurement information to the base station. In this case, index information of channel measurement information may be not delivered to the base station.

In the fifth embodiment, the controller 805 may provide a first flag indicating presence of logged channel measurement information and a second flag indicating completion of MDT measurement to the base station. The controller 805 may perform other operations in the same way as in the third or fourth embodiment described above.

The buffer 810 stores collected channel measurement information, and sends the same through the transceiver 815 to the base station 110 under control of the controller 805.

Figure 9:
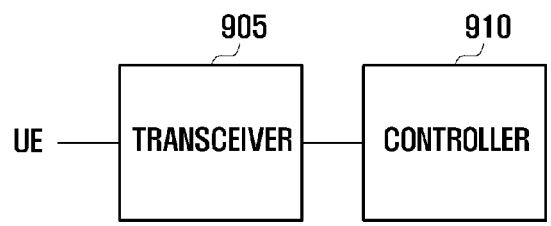
FIG. 9 is a block diagram of a base station conducting MDT operation.

FIG. 9 is a block diagram of a base station (eNB) 110 conducting MDT operation. As shown in FIG. 9, the base station 110 may include a transceiver 905 and a controller 910.

The transceiver 905 sends and receives RRC-messages to and from the user equipment 105 and receives MDT measurement information from the user equipment 105.

The controller 910 controls operations of the base station according to embodiments. In particular, the controller 910 may deliver MDT configuration information to the user equipment at the RRCConnectionReconfiguration stage. The MDT configuration information may include information regarding an MDT measurement time, a frequency band and cell to be measured, and logging and reporting of measurements.

The controller 910 may identify index information of channel measurement information received from the user equipment and determine whether to issue a report request. When the channel measurement information is necessary, the controller 910 may control an operation to send a report request to the user equipment. When the user equipment sends the channel measurement information in response to the report request, the controller 910 may receive the channel measurement information.

In the second embodiment, the controller 910 may receive channel measurement information from the user equipment at a specified time. When channel measurement information from the user equipment is not necessary, the controller 910 may deliver a report rejection indication to the user equipment.

In the third embodiment, the controller 910 may receive a flag indicating presence of logged channel measurement information from the user equipment. The controller 910 checks the flag to determine whether to issue a request for index information of channel measurement information. If necessary, the controller 910 requests the user equipment to send the index information. The controller 910 checks the received index information to determine whether to issue a report request. If necessary, the controller 910 may request the user equipment to send the channel measurement information.

In the fourth embodiment, the controller 910 may receive a flag indicating presence of logged channel measurement information from the user equipment and check the flag to determine whether to issue a report request. If necessary, the controller 910 requests the user equipment to send the channel measurement information.

In the fifth embodiment, the controller 910 may receive a first flag indicating presence of logged channel measurement information and a second flag indicating completion of MDT measurement from the user equipment. The controller 910 may perform other operations in the same way as in the third or fourth embodiment described above.

The invention claimed is:

1. A method for a terminal in a mobile communication system, the method comprising:
   receiving, from a base station, configuration information;
   logging measurement information according to the configuration information in an idle mode;
   transmitting, to the base station, a message including information indicating that the logged measurement information is available;
   receiving, from the base station, a report request based on the information indicating that the logged measurement information is available; and
   transmitting, to the base station, the logged measurement information in response to the report request in a connected mode.

2. The method of claim 1, wherein the configuration information comprises information regarding at least one of a measurement time, a frequency or cell to be measured, or a measurement logging or reporting time.

3. The method of claim 1, wherein a priority of the reporting of the logged measurement information is lower than a priority of transmission of regular data.

4. The method of claim 1, wherein transmitting the logged measurement information to the base station comprises transmitting the logged measurement information via a radio bearer having a lower priority.

5. The method of claim 1, wherein the message includes an RRCConnectionSetupComplete message.

6. The method of claim 1, wherein it is determined, by the base station, whether to retrieve the logged measurement information based on the information indicating that the logged measurement is available.

7. The method of claim 1, wherein the report request for the logged measurement information is included in a UEInformationRequest message.

8. The method of claim 1, wherein the measurement information is logged at an occurrence of predetermined events related to a channel according to the configuration information.

9. The method of claim 8, wherein the measurement information is related to the predetermined events.

10. A terminal in a mobile communication system, the terminal comprising:
    a transceiver configured to communicate with a base station; and
    a controller configured to:
       control the transceiver to receive, from the base station, configuration information,
       log measurement information according to the configuration information in an idle mode,
       control the transceiver to transmit, to the base station, a message including information indicating that the logged measurement information is available,
       control the transceiver to receive, from the base station, a report request based on the information indicating that the logged measurement information is available, and
       control the transceiver to transmit, to the base station, the logged measurement information in response to the report request in a connected mode.

11. The terminal of claim 10, wherein the configuration information comprises information regarding at least one of a measurement time, a frequency or cell to be measured, or a measurement logging or reporting time.

12. The terminal of claim 10, wherein a priority of the reporting of the logged measurement information is lower than a priority of transmission of regular data.

13. The terminal of claim 10, wherein the controller is further configured to control the transceiver to transmit the logged measurement information via a radio bearer having a lower priority.

14. The terminal of claim 10, wherein the message includes an RRCConnectionSetupComplete message.

15. The terminal of claim 10, wherein it is determined, by the base station, whether to retrieve the logged measurement information based on the information indicating that the logged measurement information is available.

16. The terminal of claim 10, wherein the report request for the logged measurement information is included in a UEInformationRequest message.

17. The terminal of claim 10, wherein the measurement information is logged at an occurrence of predetermined events related to a channel according to the configuration information.

18. The terminal of claim 17, wherein the measurement information is related to the predetermined events.

* * * * *